United States Patent [19]

Münzner et al.

[11] 4,015,956

[45] * Apr. 5, 1977

[54] PROCESS AND ARRANGEMENT FOR THE ENRICHMENT OF GASES

[75] Inventors: Heinrich Münzner, Essen-Kray; Heinrich Heimbach, Bochum; Werner Körbächer, Essen-Borbeck; Werner Peters, Wattenscheid; Harald Juntgen, Essen-Heisingen; Karl Knoblauch, Essen; Dieter Zündorf, Essen-Heisingen, all of Germany

[73] Assignee: Bergwerksverband GmbH, Essen, Germany

[*] Notice: The portion of the term of this patent subsequent to Mar. 8, 1994, has been disclaimed.

[22] Filed: Feb. 22, 1974

[21] Appl. No.: 445,319

Related U.S. Application Data

[63] Continuation-in-part of Ser. No. 245,460, April 19, 1972, abandoned, and a continuation-in-part of Ser. No. 161,211, July 9, 1971, Pat. No. 3,801,513.

[30] Foreign Application Priority Data

Apr. 23, 1971 Germany .......................... 2119829
Feb. 16, 1972 Germany .......................... 2207117

[52] U.S. Cl. ...................................... 55/25; 55/58; 55/62; 55/75
[51] Int. Cl.² ........................................ B01D 15/06
[58] Field of Search ............ 55/25, 58, 62, 75, 179, 55/389

[56] References Cited

UNITED STATES PATENTS

| | | | |
|---|---|---|---|
| 3,085,379 | 4/1963 | Kiyonaga et al. | 55/58 |
| 3,279,153 | 10/1966 | Basmadjian et al. | 55/58 |
| 3,282,028 | 11/1966 | Berlin | 55/75 |
| 3,338,030 | 8/1967 | Feldbauer | 55/58 |

Primary Examiner—John Adee
Attorney, Agent, or Firm—Michael J. Striker

[57] ABSTRACT

An initial gaseous mixture of at least two components is passed through an adsorber which preferentially adsorbs one of the components. This initially loads the adsorber. Subsequently, another gaseous mixture, having a greater proportion of the preferentially adsorbed component than the initial gaseous mixture, is passed through the adsorber so as to additionally load the adsorber. Part of the gas in the adsorber is then removed. This initially unloads the adsorber and yields a first fraction containing both components, with the proportion of the preferentially adsorbed component being greater than that in the initial gaseous mixture. The remainder of the gas in the adsorber is removed next so as to completely unload the adsorber. This results in a second fraction including both components and wherein the proportion of the preferentially adsorbed component is greater than that in both the second gaseous mixture to be passed through the adsorber and the first fraction removed from the adsorber. The first fraction may be used for additionally loading the adsorber during a subsequent cycle. An advantageous arrangement for carrying out the process is also disclosed.

25 Claims, 2 Drawing Figures

PROCESS AND ARRANGEMENT FOR THE ENRICHMENT OF GASES

CROSS-REFERENCE TO RELATED APPLICATIONS

This application is a continuation-in-part of our copending application Ser. No. 245,460 filed Apr. 19, 1972 now abandoned and entitled "Process for Enrichment of the Oxygen Content in Air and Similar Gases". This application is also a continuation-in-part of our copending application Ser. No. 161,211 filed July 9, 1971 now U.S. Pat. No. 3,801,513 and entitled "Carbon Containing Molecular Sieves".

BACKGROUND OF THE INVENTION

The invention relates generally to a process and arrangement for the enrichment of a gas containing at least two components so as to obtain a gas enriched in one of the components. More particularly, the invention relates to such a process and arrangement wherein one of the components is selectively adsorbed and subsequently desorbed to yield a gas enriched in the selectively adsorbed component. Of special interest is the oxygen-enrichment of air and similar gases by selective adsorption of the oxygen.

For recovering oxygen, there is today chiefly employed the distillation of liquid air. When it is necessary, in carrying out a process, to use a gas which, in contrast to air, has an oxygen concentration of 40–90% as, for instance, is the case in the newer procedures utilized by the iron working industry, it is customary to obtain such oxygen enriched air by mixing air with the correspondingly necessary amount of pure oxygen. It is also possible to obtain a gas of the desired oxygen content by distillation of liquid air. All of the aforesaid processes are, however, very expensive and can be made economically acceptable to industry only by continuous operation.

It has also already been proposed to recover oxygen enriched air utilizing an adsorption process employing siliceous or carbon-containing adsorption agents and involving the use of temperature or pressure changes during adsorption and desorption. Certain silicates, for example, zeolites, are effective for preferably adsorbing nitrogen from its mixtures with oxygen so that, by conducting air through a zeolite-filled adsorber, the first issuing gas is effectively enriched as regards its oxygen content. The regeneration of the zeolite, however, requires a considerable outlay for energy and apparatus. Additionally, the zeolites are completely effective only when used with dry air since they are hydrophilic.

SUMMARY OF THE INVENTION

A general object of the invention is to provide a novel process and arrangement for the enrichment of a gas containing at least two components so as to obtain a gas enriched in one of the components.

More particularly, it is an object of the invention to provide a process and arrangement for the enrichment of a gas containing at least two components wherein one of the components is selectively or preferentially adsorbed and subsequently desorbed to yield a gas enriched in the selectively adsorbed component.

Another object of the invention is to provide a process and arrangement for such enrichment whereby the enrichment may be performed in a more economical manner than was possible heretofore.

A further object of the invention is to provide a process and arrangement for such enrichment whereby the enrichment may be performed with a lower energy expenditure than was possible heretofore.

A more specific object of the invention is to provide a process and arrangement for the oxygen-enrichment of air and similar gases wherein oxygen is selectively adsorbed and subsequently desorbed by lowering of the pressure to yield an oxygen enriched gas.

Still more specifically, it is an object of the invention to provide such a process and arrangement for the oxygen-enrichment of air and similar gases utilizing carbon-containing molecular sieves or molecular sieve coke as an adsorbent.

An additional object of the invention is to provide such a process and arrangement for the oxygen-enrichment of air and similar gases which does not require drying of and/or the removal of impurities from the air or similar gas prior to adsorption of the oxygen.

Yet another object of the invention is to provide a process and arrangement for the oxygen-enrichment of air which may yield a gas containing between 40 and 90 volume % of oxygen.

It is also an object of the invention to provide a novel molecular sieve for use in the enrichment of gases, as well as a process of making the same.

In pursuance of the above objects, and of others which will become apparent, the invention sets forth a process for the enrichment of a gas including at least two components so as to obtain an enriched gas having an increased proportion of one of the components. In brief, the novel process comprises conveying an initial gaseous mixture including at least two components into at least one adsorber which adsorbs one of the components more readily than the other of the components. This initially loads the adsorber. The initial gaseous mixture has an initial proportion of the more readily adsorbed component. Another gaseous mixture, including the aforesaid more readily adsorbed component and having another proportion of this component which is greater than the proportion thereof in the initial gaseous mixture, is conveyed into the adsorber so as to additionally load the same. Part of the gas in the adsorber is then removed so as to initially unload the adsorber and obtain a first fraction which includes the aforesaid two components. This first fraction has a first proportion of the more readily adsorbed component which is greater than the proportion of this component in the initial gaseous mixture. Subsequently, substantially the remainder of the gas in the adsorber is removed. This substantially completely unloads the adsorber and results in a second fraction including both of the aforesaid two components and having a second proportion of the more readily adsorbed component which is greater than substantially the proportion of this component in both the second gaseous mixture conveyed into the adsorber and the first fraction obtained from the adsorber.

It may be seen that, in accordance with the invention, the component whose concentration is to be increased is the one which is more readily or preferentially adsorbed. This is in contrast to the known processes where that component whose concentration is to be decreased is more readily or selectively adsorbed. The invention is, therefore, of particularly great advantage in those cases where the component whose concentration is to be increased constitutes a minor fraction of the gas to be enriched, for instance, oxygen in air. The reason is that desorption of the adsorber then requires a smaller energy expenditure by virtue of the fact that a smaller quantity of gas need be desorbed. Using the oxygen enrichment of air as a basis for comparison, it is well-known that the composition of air is essentially 21 volume % oxygen and 79 volume % nitrogen. In the known processes utilizing siliceous molecular sieves, nitrogen is selectively adsorbed by the molecular sieve so that the gas emitted from the molecular sieve exhibits an increased concentration of oxygen. Here, recovery of the nitrogen requires desorption of a substantial quantity of nitrogen. On the other hand, by using the invention, oxygen will be selectively adsorbed. Recovery of the oxygen by desorption then yields an oxygen enriched gas. However, the quantity of oxygen desorbed is less than the quantity of nitrogen which must be desorbed in the aforementioned known process. Hence, the process according to the invention requires a lesser energy expenditure.

According to a favorable embodiment of the invention, the adsorber comprises a carbon-containing molecular sieve, for example, molecular sieve coke. This is advantageous since, under equilibrium conditions, carbon-containing molecular sieves take up substantially smaller amounts of water than the siliceous molecular sieves used in the prior processes. Thus, regeneration of the adsorber will not be necessary for periods ranging from several months to several years. Moreover, the fact that the carbon-containing molecular sieves take up substantially smaller amount of water than the siliceous molecular sieves under equilibrium conditions does not hinder separation of the different constituents of a gaseous mixture such as, for example, oxygen and nitrogen in air.

The invention further provides an arrangement for the enrichment of a gas including at least two components, particularly oxygen and nitrogen, so as to obtain an enriched gas having an increased proportion of one of the components. The novel arrangement comprises at least one adsorber having an inlet end and an outlet end, and means for admitting a gaseous mixture into the inlet end so as to load the adsorber. Means for unloading the adsorber through the outlet end thereof is provided as is storage means for accommodating gaseous mixtures. The storage means is of pipe-like configuration. The arrangement also includes first conduit means for establishing communication between the outlet end of the adsorber and the storage means so as to permit flow of gaseous mixture from the adsorber into the storage means. Second conduit means is further provided for establishing communication between the storage means and the inlet end of the adsorber so as to permit flow of gaseous mixture from the storage means into the adsorber to thereby at least partially load the adsorber.

By using the arrangement in accordance with the invention, the first fraction removed from the adsorber may be temporarily stored in the storage means. This first fraction may then be subsequently utilized for the additional loading of the adsorber. Similarly, if more than one adsorber is used, the first fraction obtained from one of the adsorbers may be conveyed into the storage means and then used for the additional loading of one of the other adsorbers. Surprisingly, careful research has shown that it is advantageous for the storage means to be of pipe-like or tube-like configuration.

This has the result that each first fraction withdrawn from an adsorber and used for the additional loading of the same or another adsorber has the same concentration profile when it is utilized for the additional loading as it had when it was initially withdrawn from an adsorber. The final results obtained are advantageously influenced thereby.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
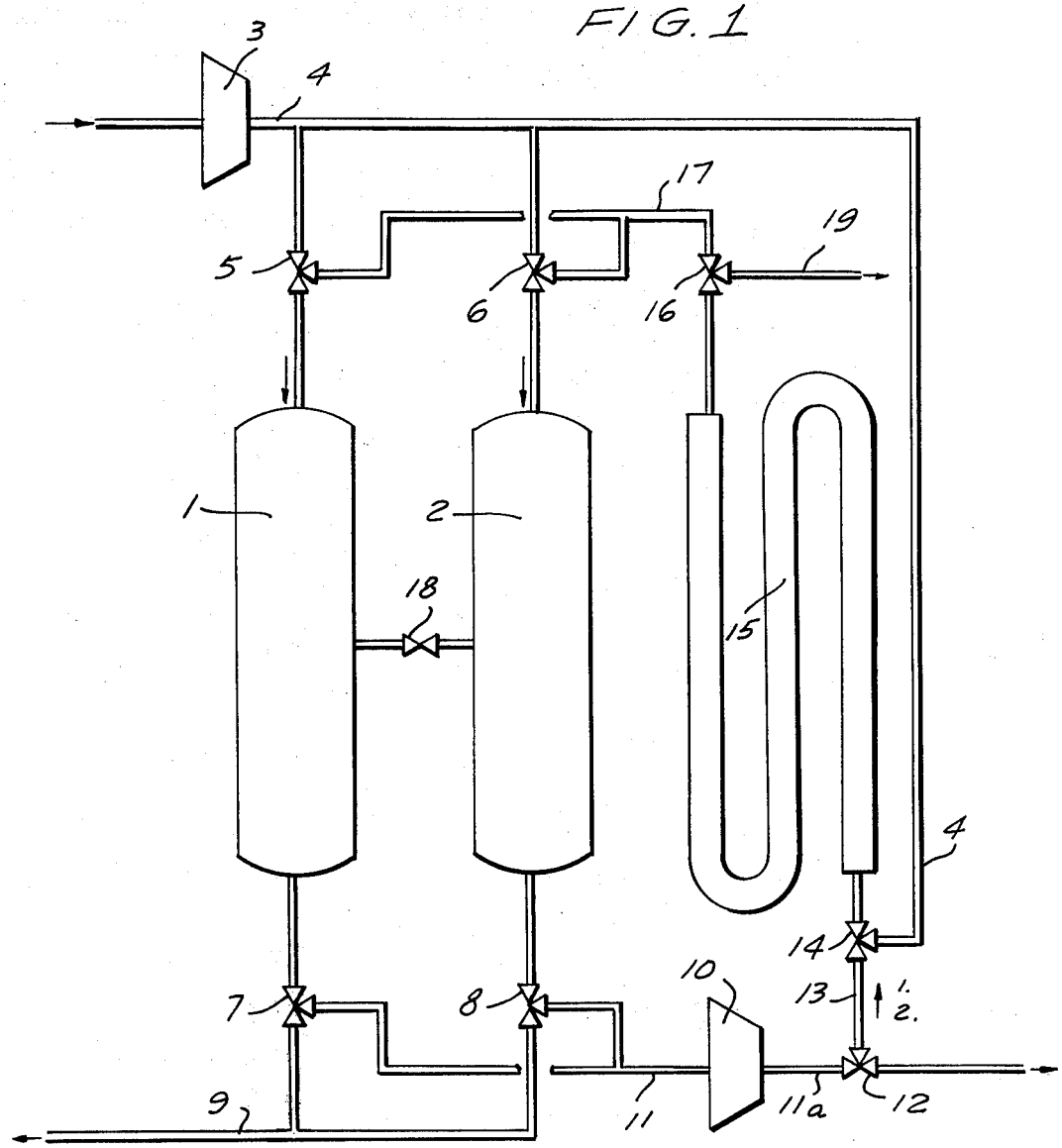
FIG. 1 is a diagrammatic representation of one form of an arrangement according to the invention.

Since the oxygen enrichment of air and similar gases is of such great technical importance, the invention will be described with reference to such oxygen enrichment. However, it is to be explicitly understood that this is not intended to limit the invention in any manner and that the invention is generally applicable to the enrichment of a gaseous mixture including at least two components so as to obtain an enriched gaseous mixture having an increased proportion or concentration of one of the components.

Briefly, then, by the process in accordance with the invention, the oxygen content of air and similar gases may be enriched by selective adsorption of the oxygen from such gases onto an adsorber and subsequent desorption of the adsorbed oxygen-enriched gas by a pressure reduction. According to a favorable embodiment of the invention, the oxygen enrichment is carried out using an alternating cycle of loading and unloading of adsorbers wherein, after loading of an adsorber, 30–70% by volume of the total gas content of that adsorber is transferred as a first fraction into a second adsorber after the second adsorber has been loaded with air but before it has been unloaded, while from the first adsorber the residual gas volume is obtained in the form of a 40–90% oxygen-containing gas by further desorption, that is, by a continuation of the unloading.

In general, the invention is particularly, although not exclusively, concerned with the enrichment of gaseous mixtures including at least two components having different molecular sizes by selective or preferential adsorption of the component of smaller molecular size. For instance, in the oxygen enrichment of gaseous mixtures of oxygen and nitrogen, the oxygen is preferentially adsorbed, that is, the component of smaller molecular size is preferentially adsorbed.

Molecular sieves capable of adsorbing that component of a gaseous mixture having a smaller molecular size can be prepared. In particular, carbon-containing molecular sieves and, more specifically, molecular sieve coke, having the ability to adsorb molecules or atoms of a given size more readily than molecules or atoms of a greater size, can be prepared. With reference to the oxygen enrichment of gaseous mixtures containing oxygen and nitrogen, it is possible to prepare molecular sieve coke which, in contrast to the zeolites mentioned earlier, have a greater capacity for adsorbing oxygen than for adsorbing nitrogen.

Due to the importance of the oxygen enrichment of air and similar gases, a process for the preparation of molecular sieve coke, hereinafter referred to as M-coke, capable of adsorbing molecules or atoms of a given size more readily than molecules or atoms of a greater size, will be described here in some detail. Although M-coke prepared by other processes may also be used in accordance with the invention, the process to be described represents a simple and economically feasible manner of making M-coke. In brief, the process resides in decreasing the size of at least some of the pores of porous coke by the thermal decomposition of hydrocarbons so that the adsorption capacity of the coke for gases of small molecular size is not changed substantially whereas, however, the adsorption capacity of the coke for large molecules is markedly decreased.

It has now been found that coke having a content of volatile components of up to about 5%, upon treatment for a certain time at 600°-900° C with a suitable hydrocarbon, results in the formation of M-coke of excellent quality. A process for manufacturing carbon-containing molecular sieves for use in the separation of small molecular gases, in particular oxygen from nitrogen, comprises treating coke, having a content of volatile components of up to about 5%, at 600°-900° C with a hydrocarbon from which carbon splits off at these temperatures. As a result, at least some of the pores present in the coke are decreased in size. The finely dispersed carbon formed by the splitting off of carbon is deposited out in the already relatively small pores of the coke and brings about a further decrease in the pore size.

To produce M-coke suitable for separating oxygen from nitrogen, the average pore size of the ultra fine pore system should be below approximately 3 angstroms (0.3 millimicrons) after treatment. For separating even smaller gas molecules, this average pore diameter should be even smaller. By changing the intensity of the treatment of the coke with hydrocarbons which split off carbon at 600°-900° C, the average pore diameter can be adjusted according to the gas mixture to be separated with the M-coke.

The quality and suitability of the coke thus produced can be established by passing air upwardly through a tube filled with the M-coke, and having a capacity of 1 liter, for a period of 1 minute at a velocity of 30 cm/sec. and thereafter analyzing the adsorbed gas following desorption thereof by means of a vacuum.

When tested as just set out, coke produced in accordance with the invention results in a gas having a composition of 35 volume % oxygen or more and 65 volume % nitrogen or less.

In order to obtain the desired constriction or narrowing of the pores, the treatment of the coke with the hydrocarbon is carried out for a period of 1 to 60 minutes, or even longer. The cooling of the heated material is most advantageously carried out in the treatment atmosphere. There can also be used during cooling streams of an inert gas, for instance, nitrogen. This accelerates the cooling and serves the additional purpose of avoiding the introduction of any oxygen during cooling. The introduction of oxygen during cooling is preferably avoided in any case.

All forms of coke containing up to 5% volatile components are suitable for treatment by the process such as cokes derived from mineral coal, including anthracite; brown coal; peat; coconut shell; and wood. The known petroleum cokes, cokes prepared by the pyrolysis of plastics and activated carbonaceous material are also suitable. In order that the gases to be separated may be able to pass through the M-coke, it is advantageous, in accordance with the invention, that the material to be subjected to the treatment have a designated particle size and, in particular, a particle size from 0.1 to 20 mm.

The hydrocarbons which may be advantageously used in the treatment include the exhaust gas of a coke forming process, long distance illuminating gas, natural gas, city gas, coking gas and all of the known hydrocarbons which are thermally decomposed with the splitting off of carbon such as benzene, toluene, xylene, naphthalene, methane, ethane, hexane, cyclohexane, ethylene, acetylene, methanol, ethanol, isopropanol, ethylene chloride and tetrachlorinated hydrocarbons.

Instead of using coke which is brought to the desired particle size by comminution, there can also be used, in accordance with the invention, formed and shaped coke bodies. In this connection, there come into consideration spherical, cylindrical, hollow cylindrical and eggshaped coke bodies, as well as larger coke briquettes which are reduced to the desired particle size. The manufacture of shaped coke bodies can take place using various methods:

1. Suitable coal, carbon, carbonaceous material and/or coke is briquetted according to any desirable briquette-forming technique, for instance, using 15-40% of a binding agent such as pitch, bitumen, tar or tar oil, and the shaped bodies thus formed coked at 600°-900° C. The briquetting can take place at normal or elevated temperatures using a stamping press, extrusion press or rolling press. 2. Coal, carbon or carbonaceous material, if necessary, in admixture with pitch, bitumen, tar or tar oil, is shaped to the form of spherical bodies having the desired size by pelletizing and the resulting pellets then coked.

The treatment in accordance with the invention can be carried out by heating cold coke to a temperature of 600°-900° C under an inert gas stream and then maintaining the coke at this temperature for an extended period of time in an atmosphere where splitting off of carbon occurs. Alternatively, the treatment can be carried out directly after coking of the starting material either in the same reactor as used for the coking operation or in a different reactor. If the coking is carried out with starting materials containing pitch, bitumen, tar or tar oil, then large amounts of gaseous coking products are formed during the coking operation. If these coking products are not removed such as, for example, with a rinsing or scavenger gas, the desired atmosphere is automatically adjusted so that the gaseous coking products act as a hydrocarbon which splits off carbon. In this case, it is possible to avoid the introduction of a hydrocarbon. However, even in such cases, depending upon the character of the coke, a further increase in the separating capacity of the coke is frequently obtained by the additional introduction of a hydrocarbon.

The following Examples, which are not to be construed as limiting in any manner, are intended to illustrate the process of making M-coke.

EXAMPLE 1

Particulate mineral coal, all of the particles of which have a particle size of less than 0.08 millimeters, is treated in a fluidized bed with air at a temperature of 230° C until an oxygen content of 12% by weight is obtained. 77 parts by weight of the thus-treated coal is mixed with 23 parts by weight of soft pitch (Kramer-Sarnow softening point 52°–56° C) at about 70° C while adding water. The mixture is shaped in an extruder to the form of cylindrical bodies having a diameter of 2 millimeters and degassed in a rotating tubular oven from which air is excluded. The temperature in the oven is increased at an average of 10° C per minute until a final temperature of 800° C is reached. A stream of nitrogen is introduced into the oven when it reaches a temperature of 750° C and, after a temperature of 800° C is obtained, 100 grams of benzene per $Nm^3$ is added to the nitrogen stream. This treatment is continued for a period of 20 minutes at constant temperature. Thereafter, cooling is effected in an atmosphere of pure nitrogen. The quality test outlined above yielded a gas of the following composition: 54 volume % oxygen and 46 volume % nitrogen. If the test is supplemented by passing a gas containing 50 volume % each of oxygen and nitrogen through the tube instead of air, then the desorbed gas has a composition of 83 volume % oxygen and 17 volume % nitrogen. Moreover, if the test is perfomed by passing a gaseous mixture of 23 volume % oxygen and 77 volume % argon through the tube instead of air, then the desorbed gas has a composition of 59 volume % oxygen and 41 volume % argon.

EXAMPLE 2

Particulate mineral coal, all of the particles of which have a particle size of less than 0.08 millimeters, is treated in a fluidized bed with air at a temperature of 230° C until an oxygen content of 12% by weight is obtained. 77 parts by weight of the thus-treated coal is mixed with 23 parts by weight of soft pitch (Kramer-Sarnow softening point 52°–56° C) at about 70° C while adding water. The mixture is shaped in an extruder to the form of cylindrical bodies having a diameter of 2 millimeters and degassed in a rotating tubular oven from which air is excluded until a volatile components content of 2% is obtained. The temperature in the oven is increased at an average of 10° C per minute until a final temperature of 800° C is reached. Thereafter, cooling to room temperature is effected while introducing nitrogen into the oven. The quality test yielded a gas of the following composition: 42 volume % oxygen and 58 volume % nitrogen.

EXAMPLE 3

80% anthracite and 20% bituminous coal is pelletized to the form of spherical particles having a diameter of 3 millimeters while applying a water spray. The anthracite has a volatile components content of 8% and the bituminous coal has a volatile components content of 20.5%. The coal is in the form of particles having a particle size of less than 0.5 millimeters and the finest particles have a size of less than 0.06 millimeters and constitute 55 to 60% of the coal. The pellets are carefully heated in a rotating tubular oven to 750° C and coked or carbonized. After a volatile components content of 3% is obtained, a stream of nitrogen, to which is added 100 grams of toluene per $Nm^3$, is passed over the pellets for a period of 30 minutes. Subsequently, the coke pellets are cooled under an inert gas stream. The quality test yielded a gas of the following composition: 37 volume % oxygen and 63 volume % nitrogen.

EXAMPLE 4

76 parts by weight of particulate wood coal, all of the particles of which have a particle size of less than 0.1 millimeters, is mixed with 24 parts by weight of soft pitch (Kramer-Sarnow softening point 52°–56° C) at about 70° C while adding water. The mixture is shaped to the form of cylindrical bodies having a diameter of 2 millimeters in an extruder and degassed in a rotating tubular oven from which air is excluded. The temperature in the oven is increased at an average of 10° C per minute until a final temperature of 800° C is reached. Thereafter, cooling to room temperature is effected while introducing nitrogen. The thus-obtained product has a volatile components content of 1.5%. The quality test yielded a gas of the following composition: 38 volume % oxygen and 62 volume % nitrogen.

EXAMPLE 5

76 parts by weight of particulate wood coal, all of the particles of which have a particle size of less than 0.1 millimeters, is mixed with 24 parts by weight of soft pitch (Kramer-Sarnow softening point 52°–56° C) at about 70° C while adding water. The mixture is shaped into the form of cylindrical bodies having a diameter of 2 millimeters and degassed in a rotating tubular oven from which air is excluded. The temperature in the oven is increased at an average of 10° C per minute until a final temperature of 800° C is reached. A stream of nitrogen is introduced when the temperature in the oven exceeds 750° C and, after a temperature of 800° C is reached, a quantity of isopropanol amounting to 100 grams per $Nm^3$ is added to the nitrogen stream. The treatment in the isopropanol-nitrogen stream lasts for 20 minutes. Thereafter, cooling is effected under pure nitrogen. The quality test yielded a gas of the following composition: 49 volume % oxygen and 51 volume % nitrogen.

EXAMPLE 6

Particulate coconut shell, having a particle size between 1 and 3 millimeters, is heated to 750° C in a rotating tubular oven at a rate of 3° C per minute so that the volatile components content amounts to 4.5%. This temperature is maintained constant for a period of 30 minutes and a quantity of ethylene is introduced into the oven. Thereafter, cooling is effected under pure nitrogen. The quality test yielded a gas of the following composition: 50.5 volume % oxygen and 49.5 volume % nitrogen.

EXAMPLE 7

Particulate mineral coal, all of the particles of which has a particle size of less than 0.08 millimeters, is preoxidized in a fluidized bed with air at a temperature of 230° C until an oxygen content of 12% by weight is obtained. 77 parts by weight of the thus-treated coal is mixed with 23 parts by weight of soft pitch (Kramer-Sarnow softening point 52°–56° C) at about 70° C while adding water. The mixture is shaped to the form of cylindrical bodies having a diameter of 2 millimeters and degassed in a rotating tubular oven from which air is excluded. The temperature in the oven is increased at an average of 10° C per minute until a final temperature of 800° C is reached. Thereafter, cooling is effected to room temperature while introducing nitrogen. In a further treatment step, the thus-obtained product is again heated in a nitrogen stream to a temperature of 800° C. Then, carbonization gas generated in a coking process is added to the nitrogen stream. After 30 minutes, cooling is effected in pure nitrogen. The quality test yielded a gas of the following composition: 45 volume % oxygen and 55 volume % nitrogen.

EXAMPLE 8

Peat coke is worked up to a particle size between 1 and 3 millimeters and is heated to a temperature of 800° C in a nitrogen stream using a rotating tubular oven. Then, gaseous toluene is added to the nitrogen stream and the temperature maintained constant for a period of 30 minutes. Subsequently, cooling is effected in a stream of pure nitrogen. The quality test yielded a gas of the following composition: 36 volume % oxygen and 64 volume % nitrogen.

The following Examples outline further tests performed with M-coke made as described above.

EXAMPLE 9

Two adsorption vessels are loaded with 20 m³ of M-coke manufactured according to Example 1. During the adsorption cycle, 6000 m³ of air, which has been neither dried nor freed of carbon dioxide, is charged through each of the adsorption vessels for a period of 100 seconds at a pressure of 1.05 atmospheres. The desorption cycle also lasts for 100 seconds and takes place at a pressure of 50 torr which is achieved by suction. By alternate operation of the two adsorption vessels, a gas having a composition of 51 volume % oxygen and 49 volume % nitrogen is recovered.

EXAMPLE 10

Two adsorption vessels, similar to those used in Example 9, are loaded with 1000 ccm of M-coke manufactured according to Example 6. Adsorption is achieved by alternately pumping 28000 ccm of a gas consisting of 5 volume % He and 95 volume % CH₄ into each adsorption vessel at a pressure of 40 atmospheres. The time required is 30 seconds. In the second step of the procedure, the pressure is abruptly dropped to 1 atmosphere. In the third step, desorption is achieved by suction and at pressures no lower than 20 torr. 1000 ccm of a gas containing 20 volume % He and 80 volume % CH₄ is recovered.

For the sake of simplicity, the enrichment process of the invention will hereinafter be described with reference with reference to M-coke as an adsorbent. However, it will be understood that other suitable adsorbents may also be used.

Proceeding now with the more detailed description of the enrichment process of the invention, it has been found that the enrichment is most advantageously performed using a two-stage loading, i.e. adsorption, procedure and a two-stage unloading, i.e. desorption, procedure. Of course, other possibilities exist such as, for instance, single-stage loading which, however, is not a preferred procedure as will be discussed more fully below. It is also pointed out here that the invention is applicable to one, two or more adsorbers, although the use of at least two adsorbers is better for a continuous process than the use of a single adsorber.

Consider now the oxygen enrichment of air by a two-stage loading, two-stage unloading procedure. Air, constituting an initial gaseous mixture, is passed through an adsorber containing M-coke which more readily or preferentially adsorbs the oxygen in the air. This initially loads the M-coke or adsorber. The air conveyed into the adsorber has an initial proportion or concentration of the more readily adsorbed component thereof, namely, oxygen, which amounts to 21 volume %. During this loading stage, gas escapes from or flows out of the adsorber and, particularly if the adsorber is under vacuum, that is, unloaded or evacuated, at the beginning of this stage, the escaping gas initially has an oxygen content of less than 21 volume % since the adsorber retains the oxygen preferentially to the nitrogen so that the nitrogen content of the escaping gas is effectively increased. However, as the loading progresses, the oxygen content of the escaping gas will increase until it attains the composition of air, this indicating that the oxygen concentration of air is no longer sufficient to further load the adsorber. If desired, the point at which the gas escaping from the adsorber attains the composition of air may be used as the termination point of the initial loading stage although this stage may be terminated prior thereto or thereafter without adverse effects.

Upon completion of the initial loading stage, another gaseous mixture having another proportion or concentration of oxygen greater than 21 volume %, i.e. greater than the initial proportion of oxygen, is conveyed into the adsorber so as to additionally load the same. The gas used in this additional loading stage may, for instance, be oxygen-enriched air having an oxygen concentration between 25 and 40, or perhaps 45, volume %. Again, gas escapes from or flows out of the adsorber during this additional loading stage. This escaping gas is displaced from the adsorber by the introduction of the enriched air. In this connection, it is pointed out that one of the unexpected features of the process according to the invention is that, at least during the initial part of the additional loading stage, the escaping gas has an oxygen content which is lower than or equal to the oxygen content of air. This appears to be due to the fact that, during the adsorption in the additional loading stage, such large quantities of nitrogen are liberated, that the escaping gas contains relatively large amounts of nitrogen and, hence, has a relatively low oxygen content. This was unexpected. Preferably, the quantity of enriched air conveyed into the adsorber during the additional loading stage is so regulated that the escaping gas does not become too enriched in oxygen, that is, so that the enriched air does not escape from the adsorber. Thus, it is advantageous to terminate the additional loading stage when the escaping gas has a composition similar to that of air.

Once the adsorber has been additionally loaded, part of the gas in the adsorber is removed therefrom. This may be accomplished, for example, by effecting a pressure reduction in the adsorber as may be done by using a vacuum pump, for instance. This initially unloads the adsorber. During the initial unloading, some of the oxygen is desorbed and unadsorbed gases such as air and nitrogen, which were trapped in the free spaces within the adsorber during the loading stages, are also at least partially removed. The initial unloading of the adsorber yields a first fraction containing oxygen and hydrogen and having a first proportion or concentration of oxygen which is greater than that of air, that is, the proportion of oxygen in the first fraction exceeds the initial proportion of oxygen used in the initial loading stage. In fact, the oxygen content of the first fraction may be between 25 and 40 volume % (compared with 21 volume % oxygen in air). The quantity of the first fraction is advantageously between 30 and 70 volume % of the total gas content of the adsorber. This first fraction may be used for the additional loading of the adsorber in a subsequent cycle. On the other hand, if more than one adsorber is being used, the first fraction may be utilized for the additional loading stage of another adsorber. In either event, the first fraction may, if desired, be conveyed into a storage container and stored there until it is needed.

After the adsorber has been initially unloaded, the remainder of the gas in the adsorber is removed therefrom. This may, for example, be accomplished by reducing the pressure in the adsorber beyond that used in the initial unloading stage. The adsorber is thus substantially completely unloaded. During the second unloading stage, substantially all of the remaining adsorbed oxygen is desorbed and gas still trapped in the free spaces of the adsorber will also be removed. The second unloading stage yields a second fraction containing oxygen and nitrogen and having a second proportion or concentration of oxygen which exceeds substantially that of the first fraction and is greater than substantially the proportion of oxygen contained in the enriched air used for the additional loading stage. The second fraction will usually have an oxygen content between about 40 and 90 volume % and is the product which it is desired to obtain.

It will be seen from the foregoing that, in particular, a two-stage unloading procedure results in a second fraction having a higher oxygen content than the first fraction. The reason for this is that the first fraction includes most of the unadsorbed air which fills the free spaces within the adsorber and, hence, the oxygen concentration of the first fraction is reduced. On the other hand, the main part of the adsorbed oxygen is liberated during the second unloading stage and is, therefore, contained in the second fraction thereby resulting in a high oxygen concentration.

As mentioned earlier, a single-stage loading procedure could be used if desired. Thus, an evacuated adsorber could conceivably be loaded by passing an oxygen-enriched gas, e.g. a gas having an oxygen content of 25 to 45 volume %, therethrough until the escaping gas attains an oxygen content of about 21 volume %, that is, an oxygen content about equal to that of air. When the adsorber is subsequently unloaded, the gas obtained would have an oxygen content between 40 and 90 volume %. Although this procedure is operative, it is not preferred since it is uneconomical in requiring too much oxygen-enriched gas. It is for this reason that a two-stage loading procedure is preferable since the adsorber may then be partially loaded using air which is a readily available source of oxygen. Thus, instead of using oxygen-enriched gas for the entire loading of the adsorber, only part of the loading need be performed with oxygen-enriched gas, i.e. the additional loading.

As will now be appreciated, it has been found that, by alternate loading and unloading, there can be recovered from each adsorber a first fraction having an oxygen content of about 25–40 volume % and, thereafter, a second fraction having an oxygen content of about 40–90 volume %, particularly where each first fraction is introduced into the same or another adsorber so as to effect an additional loading of the M-coke with oxygen-enriched air and produce an average oxygen concentration of 25–40%.

In accordance with the invention, initial loading of the M-coke can be carried out with air which is not completely dry, and even using impure air. It is sufficient if the air is conducted over and through the M-coke at about atmospheric pressure for a period of 20–180 seconds and, preferably, 60–140 seconds. The loading can also take place at higher pressure, although satisfactory oxygen contents are realized even when the loading is carried out under normal pressure. As already mentioned, the completion of the initial loading can be established by analyzing the gas discharged from the adsorber and determining that point at which the gas leaving the adsorber has the same composition as the entering gas. The introduction of air into the adsorber can be continued up to the time when the discharged gas has the same composition as the gas introduced into the adsorber. The introduction of air into the adsorber can, however, be terminated before or after this point has been reached without any disadvantageous results.

In general, depending on the activity of the M-coke, air in an amount of 2–20 and, preferably, 4–12 times the volume of the adsorber may be used for the initial loading.

The unloading of the adsorber may be effected by pumping off the adsorbed gases with a vacuum pump. For the unloading, pressures from about 760 torr and down to between 200 and 400 torr may be used for desorption of the first fraction, which is between 30 and 70 volume percent of the total gas in the adsorber, and pressure from between 200 and 400 torr and down to between 15 and 100 torr, preferably 30 to 50 torr, may be used for desorption of the remaining volume. Moreover, by using the invention, it is technically feasible to successively collect the desorbed gases as two fractions and to introduce the first fraction into the same or another adsorber at a desired time while recovering the remaining fraction as the product from the second unloading stage. By using efficient vacuum pumps, the first unloading stage may in general, be completed after 2–20 seconds and, preferably, after 9–17 seconds, and the second unloading stage may be completed after 20–180 seconds, preferably 90–140 seconds.

The introduction of the first fraction into the same or another adsorber which has been loaded afresh with air takes place so that large amounts of the already oxygen-enriched first fraction are not discharged from this adsorber but so that only air, or gas having a composition close to that of air, is displaced from the adsorber by the introduced gas. This displaced gas is, at most, only slightly enriched with oxygen and can be discharged as waste gas. It can, however, also be used for renewed initial loading of the adsorber from which the first fraction was obtained.

The escape of small amounts of the oxygen-enriched gas of the first fraction from the adsorber being additionally loaded thereby does not seriously effect the desired results sought to be achieved. It is recommended, however, that for the purpose of additional loading of the M-coke, the quantity of the first fraction admitted into an initially loaded adsorber be such that none of the oxygen-enriched gas will be discharged therefrom. It follows that the size of the first fraction and the adsorption capacity of the M-coke should be so related that this object is always realized as closely as possible. The additional loading can be effected very rapidly and is, in general, entirely completed after 5-20 seconds and, preferably, after 9-17 seconds.

The second fraction from the adsorber which supplied the first fraction furnishes the air having the desired oxygen enrichment, i.e., the gas having 40-90 volume % of oxygen, if this adsorber has previously assumed the role of the adsorber being additionally loaded with the first fraction, that is, if the alternating cycle of loading and unloading has already been set into full operation. The significance of the latter statement will become clearer later in the description.

A further improvement in the degree of enrichment of the oxygen in the air can be obtained if, before the unloading, the adsorber being unloaded is brought into communication with a completely unloaded adsorber for a short time interval of about 0.5 to 1.0 seconds and, preferably, 1 to 3 seconds. Moreover, this measure provides a saving of energy for driving of the gas pumps.

While certain designated operating times for the individual process steps must be observed for favorable results to be obtained, the operating times for the individual process steps can, however, be varied within broad ranges.

A time plan for the operation of an arrangement having four adsorbers may, for example, be as follows:

| Adsorber | 1 | 2 | 3 | 4 |
|---|---|---|---|---|
| 1-30 sec. | loading | unloading of second fraction | unloading of first fraction | additional loading |
| 30-60 sec. | additional loading | loading | unloading of second fraction | unloading of first fraction |
| 60-90 sec. | unloading of first fraction | additional loading | loading | unloading of second fraction |
| 90-120 sec. | unloading of second fraction | unloading of first fraction | additional loading | loading |

From the above table it can be seen that, in an operation utilizing four adsorbers, the first fraction of the first adsorber may be directly introduced into the second adsorber, the first fraction from the second adsorber may be transferred into the third adsorber, etc. as is shown by the arrows.

The individual time spans for carrying out the different stages are, as will be clear, dependent on the rates at which the gases are adsorbed onto and desorbed from the M-coke, the capacity and size of the adsorber and the efficiency and capacity of the blowers and vacuum pumps. It would, therefore, be most desirable if a time independence could be achieved for the transfer of the first fraction from one adsorber into an initially loaded adsorber. This may be realized, in accordance with the invention, by pumping one or more first fractions into a storage container from which the oxygen-enriched gas may then be taken off and introduced into a desired adsorber.

Detailed experiments have been carried out and it has surprisingly been found that a considerable advantage is realized if the storage container is constructed in the form of a tube or pipe. This has the result that each first fraction has the same concentration profile when being introduced into an adsorber for the purpose of additional loading as it had when it was removed from the adsorber which supplied this first fraction. This favorably influences the final result.

The use of a storage container which is able to accommodate only a single first fraction and which has a volume corresponding to the volume of the first fraction at normal pressure is sufficient for a particularly advantageous embodiment of the invention wherein only two adsorbers are utilized. An arrangement for carrying out this embodiment of the invention is illustrated in FIG. 1.

The arrangement includes two parallel adsorbers 1 and 2 and a storage container 15 which, via the conduits 4 and 17 and the valves 5, 6 and 16, are connected with a blower 3 for the introduction of air or the first fraction. The conduits 9 and 11, as well as the valves 7 and 8, link the adsorbers 1 and 2 with a vacuum pump 10 for discharging oxygen-depleted air or waste gas and oxygen enriched air. The conduits 11a and 13 and the valves 12 and 14 connect the vacuum pump 10 with the storage container 15 for transferring the first fraction. The adsorbers 1 and 2 are filled with M-coke. Also, in the illustrated embodiment, the storage container 15 is of tube-shaped or pipe-shaped configuration.

For starting up the system, air is blown into and through the adsorbers 1 and 2, via the conduit 4 and the valves 5 and 6, by the blower 3. The air is blown in at a pressure of, for example, 0.1 atmospheres in excess of atmospheric pressure, for a period of about 1 minute. It will be understood that the values given here are only approximate since air will be admitted into the adsorbers 1 and 2 until the escaping gas has the composition of air. The air from which oxygen has been removed is discharged from the adsorbers 1 and 2 as waste gas over the valves 7 and 8 and the conduit 9. By means of suction induced by the vacuum pump 10, and by closing the valves 6 and 7 and appropriately setting the valve 8, the first fraction is taken off from the adsorber 2 via the conduits 11 and 11a until the pressure in the adsorber 2 reaches, for instance, 300 torr. This fraction, and this applies only for start-up of the operation, is then taken off as waste gas through the valve 12. Thereafter, the second fraction, which is withdrawn from the adsorber 2 by pumping down to about 40 torr, for example, is removed from the adsorber 2 through the valve 12, the conduit 13 and the valve 14 and introduced into the storage container 15. It is pointed out here that, in the start-up operation, only the second fraction, and not the first fraction, possesses an increased oxygen content. The first fraction is between 30 and 70 volume % of the total gas content of the adsorber 2 whereas the second fraction is the remainder thereof.

It will be understood that, for start-up of the operation, it is possible to use an air-oxygen mixture having about 25-40 volume % oxygen, which has been derived from another source, that is, it is not necessary to use an oxygen-enriched gas derived from the adsorber in the arrangement. This, incidentally, is also true for the enrichment process after start-up, although it will usually be most practical to use the oxygen-enriched gas obtained from the adsorber in the arrangement.

With regard still to the start-up operation, the second fraction is now transmitted from the storage container 15 into the adsorber 1. This may be accomplished pneumatically by forcing air through the conduit 4 and valve 14 into the container 15, whereby the second fraction is forced into the adsorber 1 via valve 16, conduit 17 and valve 5. However, vacuum pumps and gas pumps are being used more and more for transmission of a fraction from the storage container 15 into the adsorbers 1 and 2.

When the transfer of a fraction from the storage container 15 into an adsorber takes place pneumatically, air thereby delivered into the storage container 15 may be discharged from the latter by the fraction admitted into the storage container 15 during the next cycle and then either be introduced into another adsorber or, via the conduit 19, discharged into the atmosphere.

In adsorber 1, there now occurs the additional loading of the M-coke filler material with simultaneous expulsion of corresponding amounts of air, or a gas having a composition similar to that of air, which is discharged as waste gas through the valve 7 and the conduit 9. In addition, the adsorber 2 is newly loaded with air (which is again admitted until the escaping gas has the composition of air). The time at which this loading of the adsorber 2 occurs will be clarified shortly.

The system has now been placed in condition for actual cyclic operation according to the invention. A first fraction (about 25–40% oxygen) is withdrawn from the adsorber 1 and, for the purpose of additional loading, is conveyed through the valve 7, the conduits 11, 11a and 13 and the valve 14 to the storage container 15 and, from the latter, through the valve 16, the conduit 17 and the valve 6 into the adsorber 2. The transfer of the first fraction from the storage container 15 to the adsorber 2 may be accomplished pneumatically as described above or by means of a vacuum pump or gas pump. In any event, a corresponding volume of air, or a gas having a composition similar to that of air, is expulsed from the adsorber 2 and led off as waste gas over valve 8 and conduit 9 (or withdrawn for loading of the adsorber 1). After the first fraction has been removed from the adsorber 1, the second fraction is taken off as product gas. Again, the first fraction is between 30 and 70 volume % of the total gas content of the adsorber 1 while the second fraction is substantially the remainder thereof.

During the transfer of the first fraction and the residence thereof in the storage container 15, the loading of the adsorber 2 with air mentioned previously takes place. At the point where unloading of the adsorber 1 and loading of the adsorber 2 begins, there may, as previously mentioned, be brought about a pressure equalization between the two adsorbers via the valve 18. After completion of the transfer of the first fraction into the adsorber 2, the adsorber 2 is unloaded in two stages as previously described in connection with the adsorber 1 while, in this case, the adsorber 1 is loaded. The part of the cycle during which the adsorber 2 is unloaded and the adsorber 1 is loaded is similar to that just described where the adsorber 1 is loaded and the adsorber 2 is unloaded.

Figure 2:
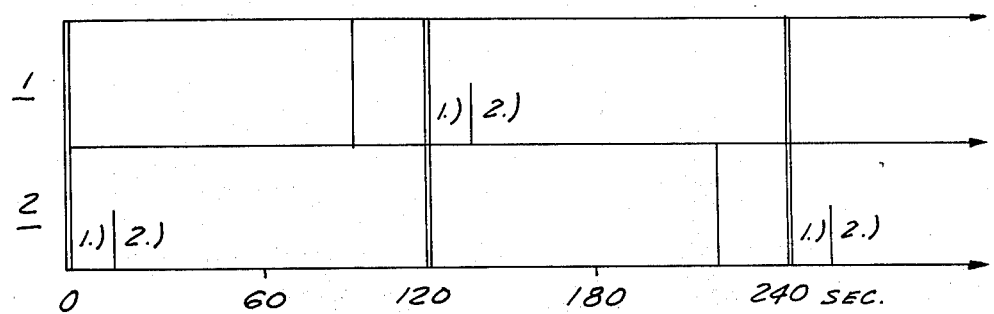
FIG. 2 represents schematically the approximate time variation of a process in accordance with the invention carried out with the arrangement of FIG. 1.

FIG. 2 represents schematically an approximate time variation for the cycle described above. As can be seen therefrom, a complete cycle may be completed in 240 seconds. In detail, FIG. 2 of the drawing shows that, for adsorbers having a capacity of about 0.5–20 m³ each, entirely satisfactory results can be obtained with the following operating times:

| Initial loading: | 20–180 seconds, preferably 60–140 seconds. |
|---|---|
| Unloading of the first fraction: | 2–20 seconds, preferably 9–17 seconds (corresponding pressure: about 760 down to 400–200 torr). |
| Unloading of the second fraction: | 20–180 seconds, preferably 60–140 seconds (corresponding pressure: from about 400–200 down to 100–15 torr, preferably 50–30 torr). |
| Additional loading with the first fraction: | 5–20 seconds, preferably 9–17 seconds. |

It will be understood that the foregoing time ranges assume the availability of suitable blowers and gas pumps, that is, blowers and gas pumps whose capacity and size is selected in accordance with the sizes of the adsorbers involved. In order to optimize an oxygen-enriching arrangement for two-stage fractionation or unloading as regards obtaining the maximum oxygen concentration and maximum productivity, the fractionation or unloading times specific to the particular arrangement should be very precisely determined empirically and should be very precisely adjusted in operation. The time ranges indicated above are applicable to a variety of arrangements and to a variety of cokes or molecular sieves.

If an adsorber is unloaded in different manners and the resulting time and pressure data plotted with pressure as the ordinate and time as the abscissa, a series of curves may be obtained indicating the decrease in pressure as a function of time. The curves have a form similar to that obtained by plotting out an inverted exponential function, that is, similar to the plot of an exponent raised to a negative power, and the uppermost of the curves corresponds to the lowest energy expenditure whereas the lowermost of the curves corresponds to the greatest energy expenditure. These curves are the result primarily of the time period selected for the unloading and, hence, the time period selected for the fractionation or unloading is of greater significance than the pressure range over which unloading occurs.

With regard to unloading of the first fraction, if this is unloaded within a shorter time period in one instance and within a longer time period in another instance, with the final pressure at the end of this unloading stage being the same in both cases, then the oxygen concentration in the former case will be lower than that in the latter case. Thus, since the oxygen concentration of the first fraction should not be excessively high in order that large quantities of oxygen be available for the second fraction, it is advantageous not to unload or pump off the first fraction too slowly.

On the other hand, as regards the second fraction, when the pressure reduction here is very rapid, the oxygen concentration in the product gas obtained will be higher than would be in the case if the pressure reduction were slower. Thus, in contrast to what applies for unloading of the first fraction, it is preferable if the pressure reduction during unloading of the second fraction is very rapid, that is, it is preferable for a strong pumping off action to be effected. Otherwise, there is the danger of readsorption occurring and a concomitant reduction in the oxygen concentration of the product gas.

In general, it is advantageous, according to the invention, to determine the optimum time and pressure ranges for the unloading stages and to maintain these during operation. Furthermore, it will be evident that care must be exercised to insure that the released gases, upon being withdrawn from the adsorbers, do not come into contact with molecular sieve material which may adsorb oxygen since, otherwise, the oxygen concentration may be decreased and the effects of the highly advantageous two-stage unloading process of the invention may be lost.

The provision of a storage container for the first fraction makes it possible to carry out the process of the invention with a single adsorber which then assumes the roles of the first and second adsorbers of FIG. 1. Thus, as soon as the single adsorber has been completely unloaded, it is newly located with air while the first fraction is retained in the storage container until this initial loading stage has been completed. Only then is the first fraction reintroduced into the single adsorber and the process continued with the single adsorber in the manner described previously.

The use of two or more adsorbers has, in contrast to an operation using a single adsorber, the advantage that the gas and vacuum pumps can be operated without interruption and that these can, therefore, be more efficiently utilized. Hence, when using two or more adsorbers, only the valves need be operated, if necessary, by utilizing a programmed regulatory procedure.

Depending upon the size of the first fraction selected, an oxygen-containing gas, having an oxygen content between 40 and 90 volume %, is obtained by the process of the invention with an energy expenditure which is substantially lower than that required for comparable low temperature distillation plants.

It is self understood that the invention is not limited to the treatment of air but can be utilized with other oxygen-containing gases which, in addition to the oxygen, contain gas molecules of larger size. Moreover, the invention is applicable to gases having higher oxygen concentrations than that of air, for instance, to gases containing 50 volume % oxygen.

If it is desired to obtain a still greater oxygen enrichment, that is, a gas containing 90 volume % oxygen and more, then the product gas obtained according to the invention may again be passed through an adsorber filled with M-coke. Evidently, it is possible instead to convey the gas containing between 40 and 90 volume % oxygen or, in other words, the product gas, through a zeolite-filled adsorber, especially since the product gas obtained in accordance with the invention is adequately dried and purified during the course of the process and, as such, provides a good starting gas for the adsorption of nitrogen therefrom using zeolites.

The following Examples are given in order to more fully illustrate the invention but are in no manner to be construed as limiting the scope thereof:

EXAMPLE 11

Two adsorbers filled with M-coke, and each having a capacity of 0.5 m$^3$, are alternately charged with air in a cyclic operation. Each adsorber is charged with 3.8 Nm$^3$ of air, which is conveyed through the respective adsorber for a period of 75 seconds, the inlet pressure of the air being 0.03 atmospheres in excess of atmospheric pressure. Subsequently, each adsorber is additionally loaded with a first fraction (at a time difference of about 180 seconds) and thereafter unloaded in two stages. The additional loading with a first fraction requires 15 seconds. Unloading of a first fraction, which is accomplished by means of a vacuum, requires 14 seconds. In either case, 59 volume % of the total adsorbed volume in each adsorber, as calculated on the basis of the initial loading with air and the additional loading with a first fraction, is unloaded. The unloaded first fraction has an average 38.7 volume % oxygen concentration. 41 volume %, which equals 0.45 Nm$^3$ total or 0.225 Nm$^3$ per adsorber, is removed as product gas. This gas has an oxygen concentration of 81.7 volume %.

EXAMPLE 12

Two adsorbers, each having a capacity of 3 m$^3$, and filled with an M-coke different from that used in Example 11 by virtue of possessing a lesser selectivity but a greater capacity, are alternately charged with air in a cyclic operation. Each adsorber is charged with 15 m$^3$ of air, which is conveyed through the respective adsorber for a period of 38 seconds, the inlet pressure of the air being 0.2 atmospheres in excess of atmospheric pressure. Subsequently, each adsorber is additionally loaded with a first fraction (at a time difference of about 90 seconds) and thereafter again unloaded in two stages. The additional loading with a first fraction requires 7 seconds. The unloading of a first fraction, which is accomplished by means of a vacuum, is completed after 4 seconds (320 torr). The unloading of a second fraction requires 41 seconds (40 torr). In either case, the volume of the first fraction amounts to 35% of the total adsorbed volume in each adsorber as calculated on the basis of the initial loading with air and the additional loading with a first fraction. The unloaded first fraction has an average 26% oxygen concentration. 65 volume %, which equals 5.5 Nm$^3$, is removed as product gas. This gas has an oxygen content of 45.5 volume %.

EXAMPLE 13

An adsorber filled with M-coke and having a capacity of 6 m$^3$ is charged with 60 Nm$^3$ of air for a period of 3 minutes, the inlet pressure of the air being 0.1 atmospheres in excess of atmospheric pressure. After closing the inlet valve, 50% of the adsorbed volume, corresponding to 3.7 Nm$^3$ of gas, is removed from the adsorber with a vacuum pump (380 torr) and discharged as waste gas. Thereafter, another 3.7 Nm$^3$ is removed as a second fraction, using a vacuum down to 30 torr, and pumped into a pipe-shaped or tube-shaped storage container. The adsorber is again charged with 60 Nm$^3$ of air for a period of 3 minutes. Subsequently, 3.7 Nm$^3$ from the storage container is introduced into the adsorber. This is completed after 20 seconds. Now, 50% of the adsorbed gas volume is again removed from the adsorber with the vacuum pump and this first fraction (32.3% average oxygen content) conveyed into the storage container. Thereafter, the second fraction is removed from the adsorber as product gas to obtain 3.7 Nm$^3$ having 78% oxygen. The adsorber is again loaded with air and with the first fraction from the storage container and the operation continued as described, namely, by conveying the first fraction from the adsorber into the storage container, recovering the second fraction as product gas and then again loading the adsorber with air.

It will be understood that each of the elements described above, or two or more together, may also find a useful application in other types of processes and arrangements differing from the types described above.

While the invention has been illustrated and described as embodied in a process and arrangement for the enrichment of gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the oxygen-enrichment of air, comprising initially loading at least one adsorber with oxygen by conveying a stream of air into said one adsorber while evacuating an initial effluent gas from said one adsorber, said one adsorber adsorbing oxygen preferentially to nitrogen, and said initial effluent gas initially having a proportion of oxygen which is less than the proportion of oxygen in said air stream; terminating said initial loading when the proportion of oxygen in said initial effluent gas approximates the proportion of oxygen in said air stream; thereafter additionally loading said one adsorber with oxygen by conveying a nitrogen-containing gas stream having substantially 25 to 40 % by volume of oxygen into said one adsorber while evacuating another effluent gas from said one adsorber, said other effluent gas initially having a proportion of oxygen which at most approximately equals the proportion of oxygen in said air stream; terminating said additional loading before the proportion of oxygen in said other effluent gas substantially exceeds the proportion of oxygen in said air stream; thereafter initially unloading said one adsorber by creating an underpressure therein so as to obtain a first fraction which has substantially 25 to 40 % volume of oxygen; subsequently substantially completely unloading said one adsorber at an underpressure so as to obtain a second fraction which has substantially 40 to 90 % by volume of oxygen; recovering said second fraction as product gas; and using said first fraction in at least one loading step similar to said additional loading step.

2. A process as defined in claim 1, wherein the steps of initially and additionally loading said one adsorber are performed at a pressure in the region of atmospheric pressure.

3. A process as defined in claim 1, wherein said one adsorber comprises molecular sieve coke.

4. A process as defined in claim 1, wherein said first fraction constitutes substantially 30 to 70 volume % of the gaseous mixture in said one adsorber.

5. A process as defined in claim 1; wherein said first fraction is readmitted into said one adsorber.

6. A process as defined in claim 5; and further comprising the step of confining said first fraction prior to readmitting said first fraction into said one adsorber.

7. A process as defined in claim 6, wherein said first fraction is confined in a space having a volume substantially equal to the volume of said first fraction at atmospheric pressure.

8. A process as defined in claim 1, wherein said steps are performed with at least one additional adsorber and said additional adsorber is additionally loaded by conveying at least part of said first fraction into said additional adsorber, said one adsorber being additionally loaded by conveying at least part of the first fraction obtained from said additional adsorber into said one adsorber.

9. A process as defined in claim 8; and further comprising confining said first fractions prior to conveying said first fractions into the respective adsorbers.

10. A process as defined in claim 9, wherein said first fractions are confined in a space of substantially tubular configuration.

11. A process as defined in claim 9, wherein each of said first fractions is confined in a space having a volume substantially equal to the volume of the respective first fraction at atmospheric pressure.

12. A process as defined in claim 8; and further comprising the step of establishing communication between said one and said additional adsorbers when one of said adsorbers is in its additionally unloaded condition and the other of said adsorbers is in its additionally loaded condition so as to equalize the pressure in said adsorbers.

13. A process as defined in claim 1, wherein the step of additionally loading said one adsorber is carried out for a period between substantially 5 and 20 seconds.

14. A process as defined in claim 13, wherein said period is between substantially 9 and 17 seconds.

15. A process as defined in claim 1, wherein the step of initially loading said one adsorber is carried out for a period between substantially 20 and 180 seconds.

16. A process as defined in claim 15, wherein said period is between substantially 60 and 140 seconds.

17. A process as defined in claim 1, wherein the step of initially unloading said one adsorber is carried out at a pressure ranging from substantially 760 torr to between substantially 200 and 400 torr.

18. A process as defined in claim 1, wherein the step of initially unloading said one adsorber is carried out for a period between substantially 2 and 20 seconds.

19. A process as defined in claim 18, wherein said period is between substantially 9 and 17 seconds.

20. A process as defined in claim 1, wherein the step of additionally unloading said one adsorber is carried out at a pressure ranging from between substantially 200 and 400 torr to between substantially 15 and 100 torr.

21. A process as defined in claim 20, wherein the step of additionally unloading said one adsorber is carried out at a pressure ranging from between substantially 200 and 400 torr to between substantially 30 and 50 torr.

22. A process as defined in claim 1, wherein the step of additionally unloading said one adsorber is carried out for a period between substantially 20 and 180 seconds.

23. A process as defined in claim 22, wherein said period is between substantially 90 and 140 seconds.

24. A process as defined in claim 1, wherein said one adsorber comprises molecular sieve coke including porous coke particles having a particle size between substantially 0.1 and 20 millimeters; and wherein carbon is deposited in at least some of the pores of said coke particles so as to reduce the effective size of said pores to less than about 0.3 millimicrons.

25. A process as defined in claim 1, wherein said one adsorber comprises molecular sieve coke having pores of an effective size less than about 0.3 millimicrons.

* * * * *